United States Patent [19]
Coy et al.

[11] Patent Number: 5,518,293
[45] Date of Patent: May 21, 1996

[54] CHILD CAR SEAT WITH TWO LATERALLY DISPOSED SEATS

[76] Inventors: Duane E. Coy, 13 Vine St., Ludlow Falls, Ohio 45339-0077; Sam B. Coy, 15 Greenville Ave., Ludlow Falls, Ohio 45339-0022

[21] Appl. No.: 231,782

[22] Filed: Apr. 25, 1994

[51] Int. Cl.⁶ ..................................... B60N 2/28
[52] U.S. Cl. .................. 297/248; 297/256.15; 297/250.1
[58] Field of Search ................................. 297/248, 232, 297/250.1, 256.15, 396

[56] References Cited

U.S. PATENT DOCUMENTS

| | | | |
|---|---|---|---|
| 3,264,382 | 8/1966 | Angell et al. | 297/396 X |
| 3,374,032 | 3/1968 | Del Guidice | 297/396 X |
| 4,342,483 | 8/1982 | Takada | 297/484 X |
| 4,886,315 | 12/1989 | Johnson | 297/256.15 |
| 5,033,761 | 7/1991 | Kelly | 297/248 X |
| 5,375,908 | 12/1994 | Goor | 297/256.15 X |

FOREIGN PATENT DOCUMENTS

| | | | |
|---|---|---|---|
| 2417413 | 9/1979 | France | 297/250.1 |
| 2559043 | 8/1985 | France | 297/232 |
| 3520256 | 12/1985 | Germany | 297/256.15 |
| 235244 | 10/1986 | Japan | 297/232 |
| 1512370 | 6/1978 | United Kingdom | 297/250.1 |
| 1519793 | 8/1987 | United Kingdom | 297/250.1 |

*Primary Examiner*—Peter M. Cuomo
*Assistant Examiner*—David E. Allred

[57] ABSTRACT

A seat frame having a base portion and an upwardly extending back portion in a generally L-shaped configuration and a downwardly extending leg portion, the base portion having forwardly extending vertical edges at the exterior edges of the seat and at a central vertical divider to divide the seat into a first side and a second side. A seat cushion and a back cushion positionable upon the base and back portions of the frame of each of the sides, a strap arrangement having shoulder straps extending downwardly from an upper extent of the back portion with a rigid locking tongue at the lower extent thereof removably positionable in a locking element in the forward extent of the seat frame. A bar arrangement having an upper horizontal bar coupled to the back of the back portion at an upper extent and a lower horizontal bar coupled with respect to the area of joining between the seat portion and leg portion and an intermediate horizontal bar therebetween with laterally extending bars at the edges of the upper and intermediate bars and at the edges of the intermediate and lower bars.

1 Claim, 5 Drawing Sheets

CHILD CAR SEAT WITH TWO LATERALLY DISPOSED SEATS

BACKGROUND OF THE INVENTION

1. Field of the Invention

The present invention relates to child car seat with two laterally disposed seats and more particularly pertains to providing seating capabilities for two children laterally spaced on a common car seat.

2. Description of the Prior Art

The use of child car seats of various designs and capabilities is known in the prior art. More specifically, various designs and capabilities heretofore devised and utilized for the purpose of providing seating capabilities for one or more children in an automobile are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 5,121,965 to Skold discloses a child's car seat.

U.S. Pat. No. 4,909,574 to Sedlack discloses a child's car seat restraint system.

U.S. Pat. No. 4,858,997 to Shubin discloses a child safety car seat.

U.S. Pat. No. Des.331,153 to Williams the design of a child's car seat.

U.S. Pat. No. Des.265,780 to Johansson the design of a safety car seat for a child.

In this respect, the child car seat with two laterally disposed seats according to the present invention substantially departs from the conventional concepts and designs of the prior art, and in doing so provides an apparatus primarily developed for the purpose of providing seating capabilities for two children laterally spaced on a common car seat.

Therefore, it can be appreciated that there exists a continuing need for new and improved child car seat with two laterally disposed seats which can be used for providing seating capabilities for two children laterally spaced on a common car seat. In this regard, the present invention substantially fulfills this need.

SUMMARY OF THE INVENTION

In view of the foregoing disadvantages inherent in the known types of various designs and capabilities now present in the prior art, the present invention provides an improved child car seat with two laterally disposed seats. As such, the general purpose of the present invention, which will be described subsequently in greater detail, is to provide a new and improved child car seat with two laterally disposed seats and method which has all the advantages of the prior art and none of the disadvantages.

To attain this, the present invention essentially comprises a seat frame having a base portion and an upwardly extending back portion in a generally L-shaped configuration and a downwardly extending leg portion, the base portion having forwardly extending vertical edges at the exterior edges of the seat and at a central vertical divider to divide the seat into a first side and a second side of similar construction and size to receive a child into each side. A seat cushion and a back cushion positionable upon the base and back portions of the frame of each of the sides, a strap arrangement having shoulder straps extending downwardly from an upper extent of the back portion with a rigid locking tongue at the lower extent thereof removably positionable in a locking element in the forward extent of the seat frame with a protector plate therebetween. A bar arrangement in a generally L-shape configuration having an upper horizontal bar coupled to the back of the back portion at an upper extent and a lower horizontal bar coupled with respect to the area of joining between the seat portion and leg portion and an intermediate horizontal bar therebetween with laterally extending bars at the edges of the upper and intermediate bars and at the edges of the intermediate and lower bars.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved child car seat with two laterally disposed seats which have all the advantages of the prior art various designs and capabilities and none of the disadvantages.

It is another object of the present invention to provide new and improved child car seat with two laterally disposed seats which may be easily and efficiently manufactured and marketed.

It is further object of the present invention to provide new and improved child car seat with two laterally disposed seats which are of durable and reliable constructions.

An even further object of the present invention is to provide new and improved child car seat with two laterally disposed seats which are susceptible of a low cost of manufacture with regard to both materials and labor, and which accordingly are then susceptible of low prices of sale to the consuming public, thereby making such child car seat with two laterally disposed seats economically available to the buying public.

Still yet another object of the present invention is to provide new and improved child car seat with two laterally disposed seats which provide in the apparatuses and methods of the prior art some of the advantages thereof, while simultaneously overcoming some of the disadvantages normally associated therewith.

Still another object of the present invention is to provide seating capabilities for two children laterally spaced on a common car seat.

Lastly, it is an object of the present invention to provide new and improved seat frame having a base portion and an upwardly extending back portion in a generally L-shaped configuration and a downwardly extending leg portion, the base portion having forwardly extending vertical edges at the exterior edges of the seat and at a central vertical divider to divide the seat into a first side and a second side of similar construction and size to receive a child into each side. A seat cushion and a back cushion positionable upon the base and back portions of the frame of each of the sides, a strap arrangement having shoulder straps extending downwardly from an upper extent of the back portion with a rigid locking tongue at the lower extent thereof removably positionable in a locking element in the forward extent of the seat frame. A bar arrangement having an upper horizontal bar coupled to the back of the back portion at an upper extent and a lower horizontal bar coupled with respect to the area of joining between the seat portion and leg portion and an intermediate horizontal bar therebetween with laterally extending bars at the edges of the upper and intermediate bars and at the edges of the intermediate and lower bars.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should-be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
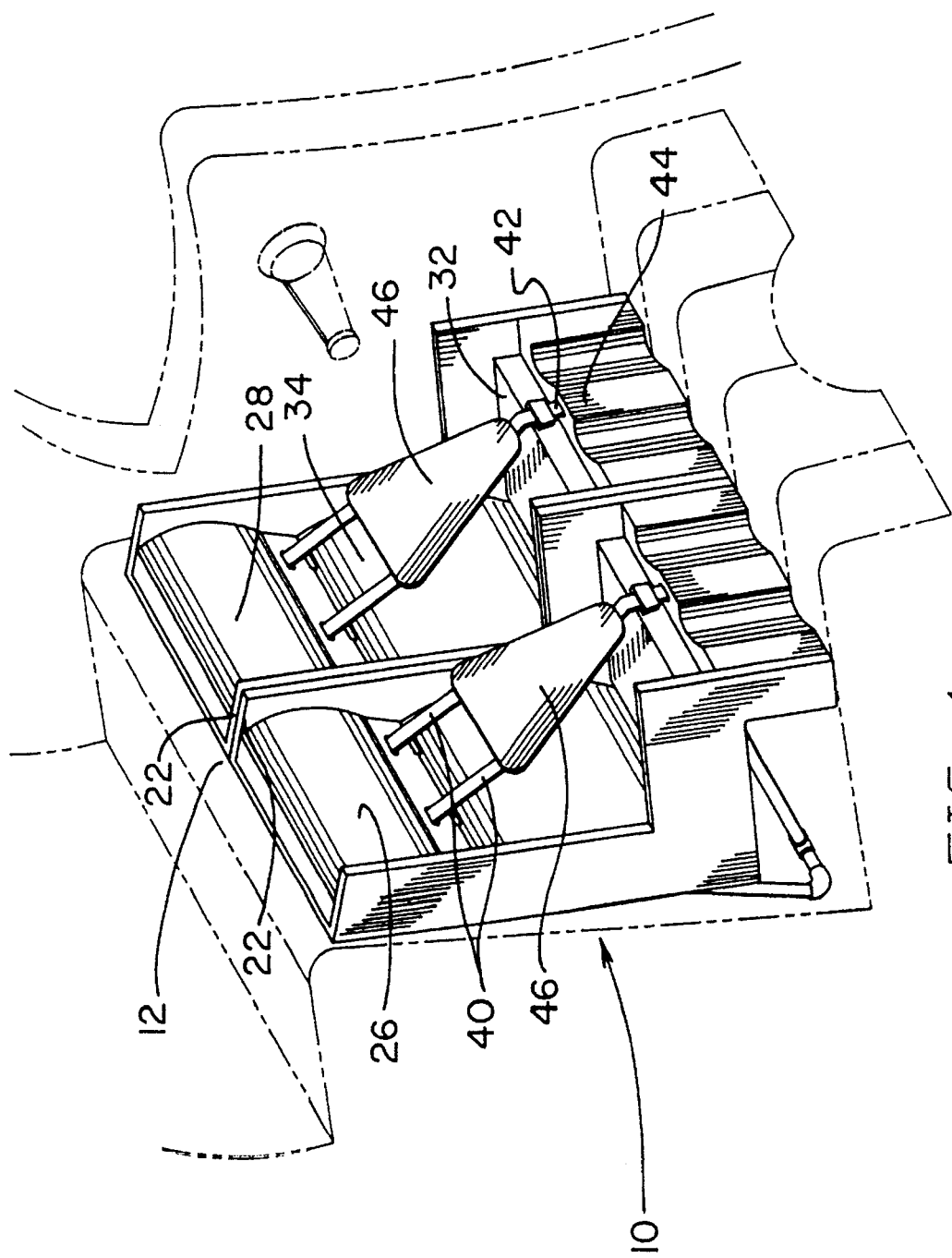
FIG. 1 is a perspective illustration of the preferred embodiment of the new and improved child car seat with two laterally disposed seats constructed in accordance with the principles of the present invention.
Figure 2:
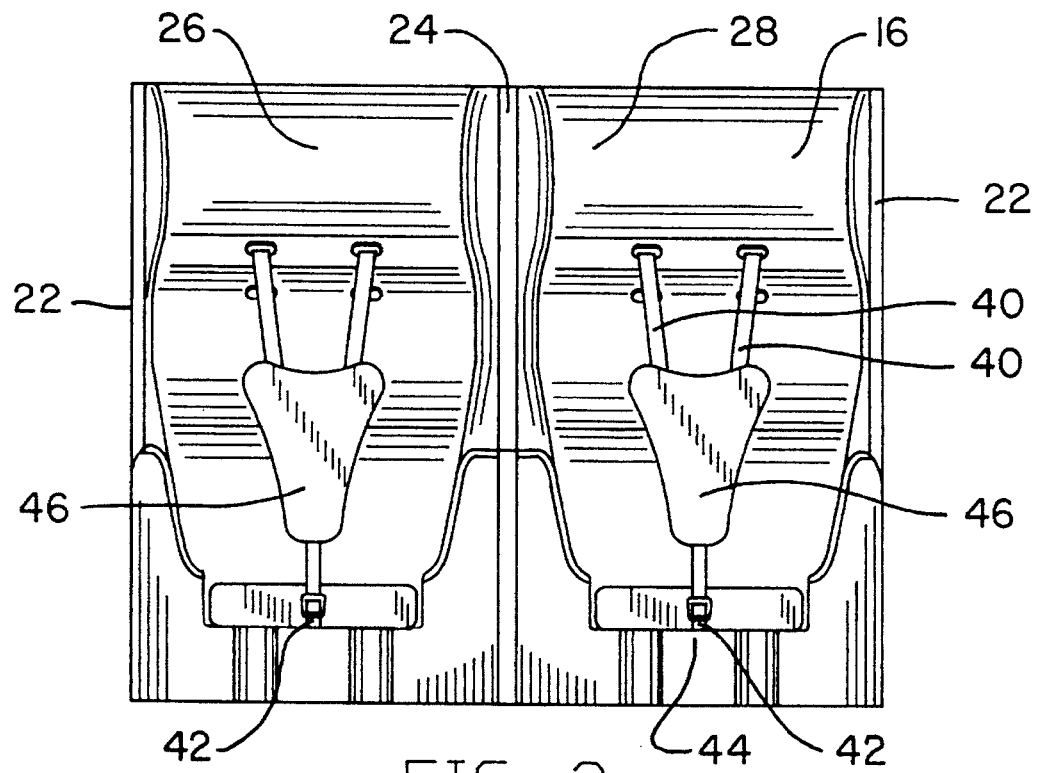
FIG. 2 is a front elevational view of the device illustrated in FIG. 1.
Figure 3:
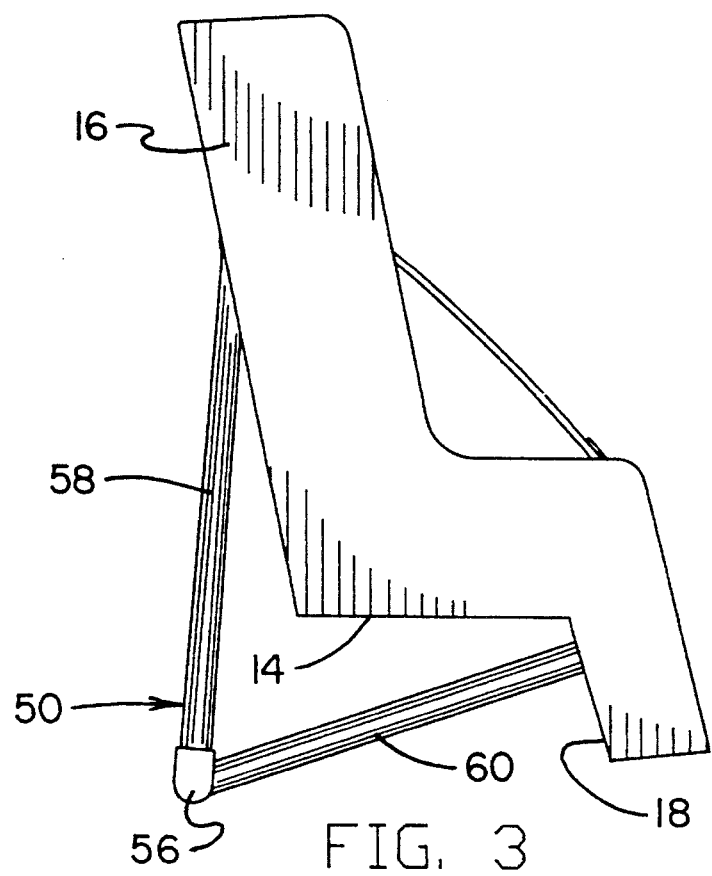
FIG. 3 is side elevational view of the device illustrated in FIGS. 1 and 2.
Figure 4:
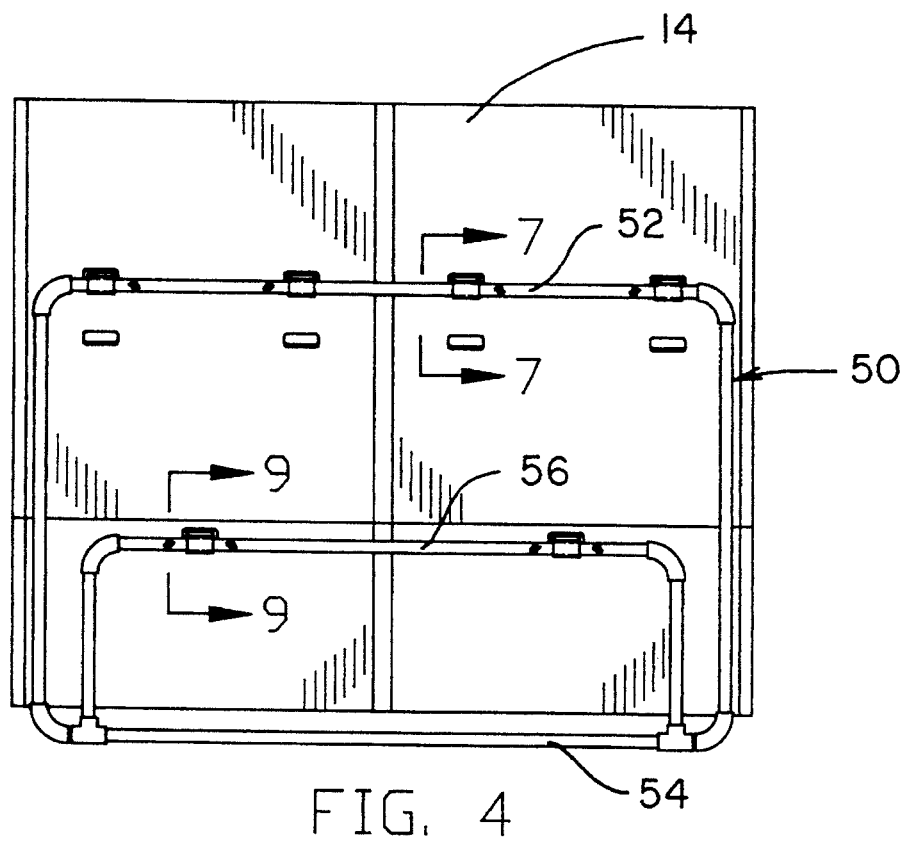
FIG. 4 is a rear elevational view of the child car seat illustrated in the prior figure.
Figure 5:
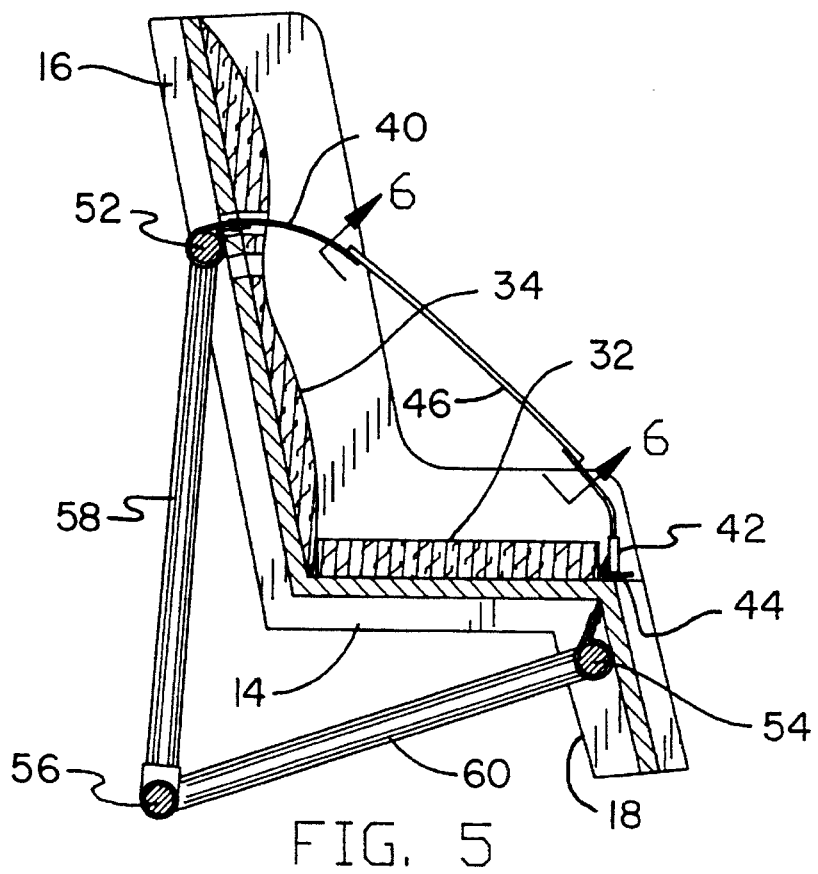
FIG. 5 is a cross sectional view taken through a vertical center line of the device of the prior figure.
Figure 7:
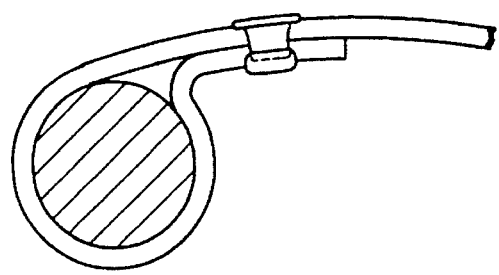
FIG. 7 is cross sectional view taken along line 7—7 of FIG. 4.
Figure 6:
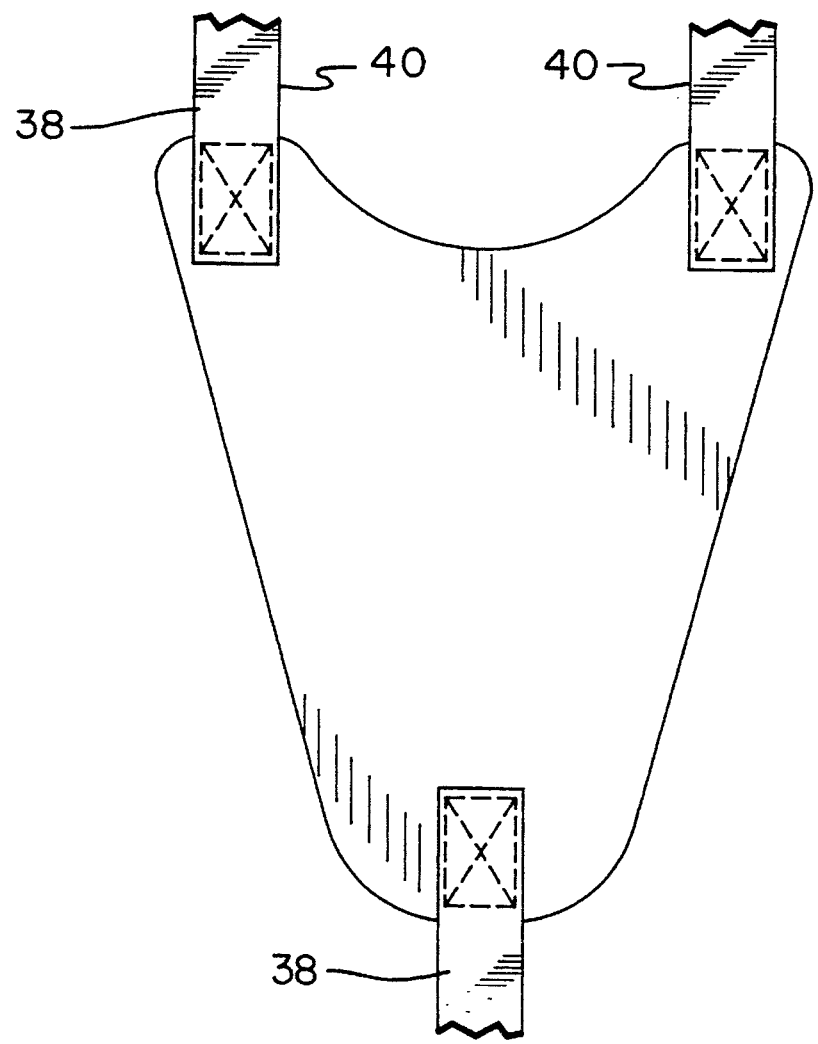
FIG. 6 is an enlarged front elevational view of the central extent of a child restraining element taken along line 6—6 of FIG. 5.
Figure 8:
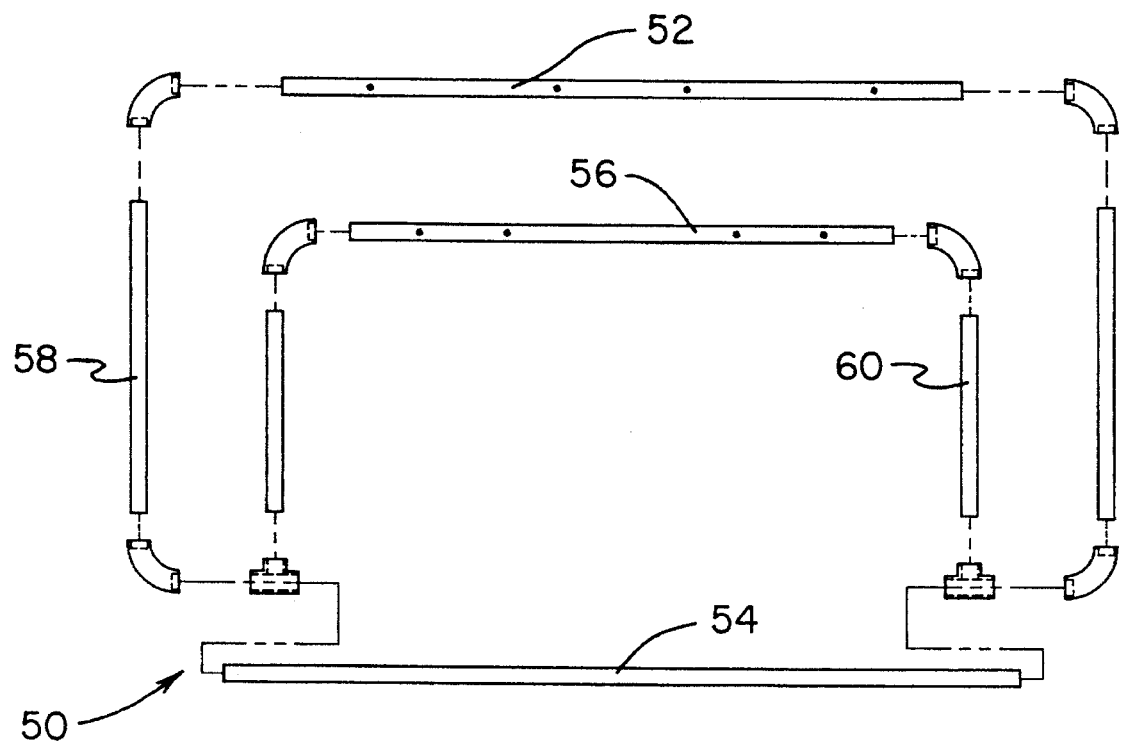
FIG. 8 is an exploded view of the components forming the brace assembly as shown in FIG. 4.
Figure 9:
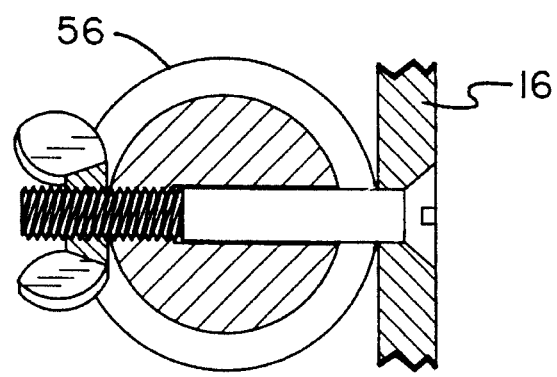
FIG. 9 is a cross sectional view taken along line 9—9 of FIG. 4.

With reference now to the drawings, and in particular to FIG. 1 thereof, the preferred embodiment of the new and improved child car seat with two laterally disposed seats embodying the principles and concepts of the present invention and generally designated by the reference numeral 10 will be described.

The present invention, the new and improved child car seat adapted to be secured to a vehicle seat with two laterally disposed seats, is comprised of a plurality of components. In their broadest context, such components include a seat frame, cushions and a bar arrangement. The individual components are specifically constructed and correlated with respect to each other so as to attain the desired objectives.

More specifically, the system 10 includes a seat frame 12. The seat frame has a base portion 14 and an upwardly extending back portion 16 in a generally L-shaped configuration. Also provided is a leg portion 18 extending downwardly from the front edge of the base portion.

The base portion is formed with forwardly extending vertical edges 22 at the exterior edges of the seat. It also includes a central vertical divider 24 to divide and separate the seat into a first side 26 and a second side 28. The first and second sides are of similar construction and size. Each is adapted to receive a child in a safe and comfortable manner.

Next provided are cushions. Such cushions include a seat cushion 32 and a back cushion 34. Such cushions are shown as separate elements but could be formed as one. The cushions are positionable upon the base and back portions of the frame of each of the sides.

Next provided is a strap arrangement 38. The strap arrangement includes shoulder straps 40. The shoulder straps extend downwardly from an upper extent of the back portion. A rigid locking tongue 42 is located at the lower extent of the straps. The locking tongue is adapted to be removably positioned in a locking element 44 in the forward extent of the seat frame. This allows a parent or other user of the system to lock or unlock a child into a safe position with respect to the seat. A protector plate 46 of a soft exterior but rigid interior is located between the upper and lower extents of the strap arrangement 38.

Greater stability is provided to the car seat of the present invention through a bar arrangement 50. The bar arrangement is a generally L-shaped configuration and includes an upper horizontal bar 52 coupled to the back of the back portion at an upper extent thereof. The bar arrangement also includes a lower horizontal bar or forward horizontal bar 54 coupled to the seat frame at the leg portion proximate to the area of joining between the seat portion and the leg portion. Also provided is an intermediate horizontal bar 56 generally between the upper and lower bar, and the intermediate horizontal bar being located below the upper and forward horizontal bars when the child seat is an a use position. Laterally extending bars or first spanning bars 58 couple the edges of the upper and intermediate bars. Additional laterally extending bars or second spanning bars 60 are at the edges of the intermediate and forward bars. The bars are coupled together for providing a secure coupling between the car seat system 10 of the present invention and the vehicle car seat upon which it is positioned.

The bar arrangement also provides an opening between the bars and the car seat for the passage of the vehicle seatbelt, not shown, for greater securement of the car seat with respect to the vehicle.

Further significant features of the present invention are snaps 64 to couple the ends of the restraining straps with respect to the horizontal bars. In addition, the bar arrangement is coupled with respect to the seat through an arrangement of wing nuts 66 and apertures in the coupled components to allow the car seat system to be disassembled for storage and transportation when not in use.

The present invention is a safety seat for a child; however, this unique and novel version is made in tandem to accommodate two children. Its overall width is approximately twenty three inches, and a padded central partition, made of solid one quarter of an inch thick plastic, serves to separate the two seats so the heads of the children will not contact each other as they doze or play. Similar walls are added to either side of the seat.

Each of the seats has a removable cushion to facilitate easy cleaning, and like its conventional counterpart, each of the seats has a restraining harness. The present invention is designed for use by families with two small children who travel in a standard cab pickup truck or some other smaller vehicle. Conventional seats can, of course, also be mounted in tandem, but this requires much more space and limits the number of additional passengers. In many cases, the only alternative is to employ two vehicles for the trip or outing.

Further, on smaller vehicles designed to seat two people, the absence of a third seat belt would make the use of two conventional seats impossible. The use of two vehicles is costly and inconvenient in the case of those owning campers, and the purchase of a larger vehicle is simply impractical. The present invention addresses and eliminates these problems. The children will enjoy the proximity of a companion, and other adults may be seated comfortably in the remaining space.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved child seat with two laterally disposed seats the child seat adapted to be secured to a vehicle seat through the use of vehicle seat belts, the child seat comprising, in combination:

a seat frame having a base portion and an upwardly extending back portion in a generally L-shaped configuration and a downwardly extending leg portion, the leg portion including two vertically oriented recessed grooves to permit the comfortable positioning of a child's legs, the seat frame having exterior edges, the base portion having forwardly extending vertical edges at the exterior edge of the seat frame and at a central vertical divider to divide the seat into a first side and a second side of similar construction and size to receive a child into each side;

a seat cushion and a back cushion positionable upon the base and back portions of the frame of each of the sides, the back cushion having a front surface and a rear surface, the front surface of the cushion being contoured to comfortably support a child's back, the front surface having an upper extent with a thick head rest, a strap arrangement having shoulder straps extending downwardly from an upper extent of the back portion with a rigid locking tongue at a lower extent of the strap arrangement, the tongue being removably positionable in a locking element in a forward extent of the seat frame with a protector plate positioned between an upper extent of the strap arrangement and the lower extent of the strap arrangement; and a bar arrangement in a generally L-shaped configuration having an upper horizontal bar coupled to the rear surface of the back cushion at an upper extent of the back cushion, a forward horizontal bar coupled to the seat frame at the leg portion proximate an intersection between the seat portion and the leg portion, an intermediate horizontal bar being located below the upper and forward horizontal bars when the child seat is in a use position, the intermediate bar being positionable upon a vehicle car seat and extending across the two laterally disposed seats, and first spanning bars being positioned between the upper and intermediate horizontal bars and second spanning bars between the intermediate and forward horizontal bars, the bar arrangement providing an opening for the passage of a vehicle seat belt.

\* \* \* \* \*